United States Patent [19]
Mynhier

[11] Patent Number: 4,854,200
[45] Date of Patent: Aug. 8, 1989

[54] PORTABLE FACING AND THREADING MACHINE HAVING AN INTERCHANGEABLE TAPER MEANS

[76] Inventor: Charles R. Mynhier, 5730 Centralcrest, Houston, Tex. 77092

[21] Appl. No.: 109,991

[22] Filed: Oct. 19, 1987

Related U.S. Application Data

[63] Continuation-in-part of Ser. No. 881,456, Jul. 2, 1986, Pat. No. 4,753,143.

[51] Int. Cl.⁴ .............................................. B23B 3/22
[52] U.S. Cl. ........................................ 82/110; 82/113; 82/128
[58] Field of Search ............... 82/2 R, 4 C, 4 R, 5, 82/15, 17, 16, 113, 117, 110, 128; 408/79, 80, 82, 104, 105, 106

[56] References Cited

U.S. PATENT DOCUMENTS

| | | |
|---|---|---|
| 2,159,287 | 5/1939 | Morgan . |
| 2,159,288 | 5/1939 | Morgan . |
| 2,211,183 | 8/1940 | Tytus et al. . |
| 3,124,024 | 3/1964 | Pittman . |
| 3,181,398 | 5/1965 | Rogers . |
| 3,691,882 | 9/1972 | Massey . |
| 3,717,055 | 2/1973 | Pendleton . |
| 3,908,491 | 9/1975 | Gilmore .................. 82/4 C |
| 4,130,034 | 12/1978 | Benoit . |
| 4,149,436 | 4/1979 | Blattler . |
| 4,259,885 | 4/1981 | Lindhag .................. 82/4 R |
| 4,343,207 | 8/1982 | Papsinger ................ 82/4 C |
| 4,411,178 | 10/1983 | Wachs .................... 82/4 C |
| 4,543,861 | 10/1985 | Kwech .................... 82/4 R |
| 4,753,143 | 6/1988 | Mynhier .................. 82/128 |

Primary Examiner—Frederick R. Schmidt
Assistant Examiner—Blynn Shideler
Attorney, Agent, or Firm—Arnold, White & Durkee

[57] ABSTRACT

A portable machine for field facing and threading of pipe including a body in which is carried a shaft for rotation about a central axis. Attachment apparatus attaches the body to the end of a pipe so that the central axis of the machine and pipe are substantially coaxial. Attached to the shaft is a cutting tool assembly which rotates with the shaft to cut the end of the pipe. Linear and radial feed components provide, respectively, generally longitudinal and transverse motion to the cutting tool assembly relative to the central axis of the machine. The relative taper and thread pitch producible on a given pipe section may be modified by interchangeable gear assemblies.

43 Claims, 7 Drawing Sheets

(8 THREADS PER INCH, 3/4 INCH TAPER PER FOOT)

PORTABLE FACING AND THREADING MACHINE HAVING AN INTERCHANGEABLE TAPER MEANS

CROSS REFERENCE TO RELATED APPLICATIONS

This application is a continuation-in-part of applicant's copending application Ser. No. 881,456, now U.S. Pat. No. 4,753,143, filed July 2, 1986, entitled "Portable Facing and Threading Machine."

BACKGROUND OF THE INVENTION

1. Field of the Invention

The present invention relates to a portable apparatus adapted for field machining of pipe, e.g., threading, rethreading, facing, refacing, etc. More particularly, the present invention pertains to a portable pipe machining apparatus, wherein the desired taper and thread pitch of a pipe end may be established by the engagement of interchangeable gear assemblies.

2. Description of the Prior Art

Sections of pipe are frequently connected for various purposes. Further, these pipe sections may be connected in several ways depending on the desired application. Many pipe sections are connected by a threaded joint in which external threads at the end of one section of pipe engage internal threads of another section. In drilling for oil and gas for example, such threaded pipe joints are used to join sections of drill pipe in a drill string which extend from the drilling rig down to the drill bit.

The seal between adjacent drill string pipe sections is usually provided by metal to metal engagement of a shoulder on the male or pin end of a pipe and the annular end face of the female or box end of the adjacent pipe. To maintain an effective downhole oil or gas drilling or recovery program, it is important that this seal between the pipe sections be maintained. Due to the hostile environment and rough handling of drill pipe, however, these seal faces and pipe threads are frequently damaged. In the past, damaged pipe sections were sent to a machine shop for refacing and/or rethreading. Since repair of the damaged pipe necessitated transport from the field to the machine shop and back to the field, this refacing and/or rethreading process was often quite costly.

In recent years, portable machines have been developed for refacing of damaged pipe joints. Examples of such portable refacing machines may be seen in U.S. Pat. Nos. 3,124,024; 3,181,398; 3,691,882; 3,717,055; 4,130,034 and 4,149,436. Most of these prior art machines utilize some type of support or mandrel which is attached to the pipe to be machined by engagement with the threads thereof. Some type of cutting tool is then provided which, upon proper rotation and feeding, cuts a new surface or face on the pipe joint.

Disadvantages of such prior art devices include their restricted application to the resurfacing of a pipe joint. If the threads of a pipe joint are damaged or worn, or if it becomes necessary to sever off a portion of the pipe joint and cut new threads and faces thereon, such portable facing machines are inadequate since they are not capable of field rethreading a virgin pipe section.

Also available in the art are portable machines adapted to utilize a cutting die such that threads may be cut on a pipe end Such devices however, are generally useful only for small diameter (<3") pipe, since for larger diameter materials, an unduly large amount of torque is required, thus necessitating the presence of large compressors or drive engines. Further, threads produced as a result of such die type operations have generally been of unacceptably poor quality since dies have a tendency to "tear" the metal pipe surface, thus producing a nonsymmetrical, ragged thread.

SUMMARY OF THE INVENTION

The present invention relates to a portable facing and threading machine which is not only capable of facing or refacing pipe joint shoulders, but is also capable of threading or rethreading the threads of a pipe joint. The present invention also relates to a portable facing and threading machine adapted to automatically form a variety of different tapers and thread pitches on the end of a pipe joint by engagement of interchangeable gear assemblies.

The portable apparatus of the present invention generally includes a body and a main frame, the body being longitudinally movable relative to the frame within a linear track. A cutting tool assembly is rotatably disposed at the frontal extent of the body about a central axis. An attachment means is also provided for detachably securing the frame to the end of a pipe section or joint, said means including a chuck for holding the pipe section relative to the frame and the body such that the central axis of the body and the axis of the pipe are substantially coincidental.

The body itself generally includes a main shaft, a linear feed means, and a taper assembly, said main shaft carried by said body and coupled to said frame for selected rotation therein about the central axis. The linear feed means is coupled to a motor or other drive means such as to enable the cutting tool assembly to move longitudinally relative to the pipe section. The taper assembly is operatively disposed between the linear feed means and the main shaft such as to translate the linear movement of said linear feed means to the main shaft. In preferred embodiments, this taper assembly is adjustable between an "on" and "off" position.

The cutting tool assembly is comprised of a tool mounting means and a radial feed means, said radial feed means operatively coupled between said main shaft and the tool mounting means such that upon longitudinal movement of the main shaft, the tool mounting means undergoes transverse movement relative to the central axis. The tool mounting means is adapted to secure one or more cutting tools in a cutting relationship relative the pipe section. The radial feed means thus allows the tool to establish incrementally deeper cuts on the pipe end or work face. The radial feed means also allows the present device to accommodate different diameter pipes or similar tubular or cylindrical pieces.

The attachment means generally includes a chuck, the chuck itself generally composed of three retaining jaws positioned in a radial configuration about the central axis so as to accept a tubular pipe section. The chuck may be operated via a crank or other means engagingly coupled to the retaining jaws.

The aforedescribed apparatus is capable of forming both linear and tapered threads from a virgin, unprepared pipe section. Further, by simple adjustment of the apparatus, either male or female threads may be fabricated. The operative engagement of the taper assembly determines whether a linear or a tapered thread is cut on the end of the pipe section. As noted, in preferred embodiments of the invention the taper assembly is movable between an "on" and an "off" position. In the "on" position, the taper assembly includes a reduction gear setup operatively engaged between the main shaft and a lead screw which, in turn, is operatively engaged to the linear feed means. This lead screw is also threadedly engaged to the body and secured to the frame. In this fashion, when the taper assembly is engaged, longitudinal movement of the body produces a longitudinal movement of the main shaft through the body, thus bringing the tool mounting means, and hence the cutting tool, into ever graduating, cutting contact with the pipe work face—thus producing a taper. This taper assembly may be interchanged depending on the angle of the desired taper.

When a straight or linear thread is desired, the taper assembly is secured in the "off" position. In this position, the reduction gear assembly is withdrawn from engagement with the main shaft and the lead screw. In this mode, the tool mounting means maintains a linear cutting angle relative to the end of the pipe section during its period of travel along the work face. This cutting angle is substantially parallel to the central axis.

As noted, the lead screw is rotatably disposed through the frame into threaded engagement with the body. In this fashion, the longitudinal travel of the body within the frame is dictated by the thread pitch of this lead screw. The pitch of this lead screw, in turn, determines the pitch of the thread cut on the pipe end. In preferred embodiments of the present invention, the lead screw may be interchanged to accommodate any desired thread pitch. Similarly, the structural configuration of the pipe thread itself may be easily modified by inserting a variety of cutting tools into the cutting tool assembly. In such a fashion, any given pitch or configuration thread may be matched or modified.

The present invention has many advantages over the prior art. First, the present invention offers a portable, compact unit which is capable of performing both resurfacing and rethreading operations on the end of a variety of differently sized pipe.

Another advantage of the present invention is its ability to form a thread or shoulder along a stationary work piece. Hence, a thread may be formed along the end of a drill pipe stuck or bent such as to be incapable of rotation.

Another advantage of the present invention is its ability to produce a pipe thread or shoulder in the field of a quality generally rivaling that produced in a machine shop or mill.

Another advantage to the present invention is its ability to operate at high rotational speeds. This is accomplished due to the inherent balance of the cutting tool assembly as it orbits the pipe pin. This allows for the utilization of carbide and similar composition cutting tools resulting in the formation of superior quality cut and thread surfaces.

Another advantage of the present invention is the relative speed at which a quality thread may be formed along the end of a given pipe section.

Yet another advantage of the present invention is its adaptability to a variety of different diameter pipes and similar cylindrical materials having an assortment of different thread and taper surfaces.

DESCRIPTION OF THE PREFERRED EMBODIMENT

Figures 1, 2:
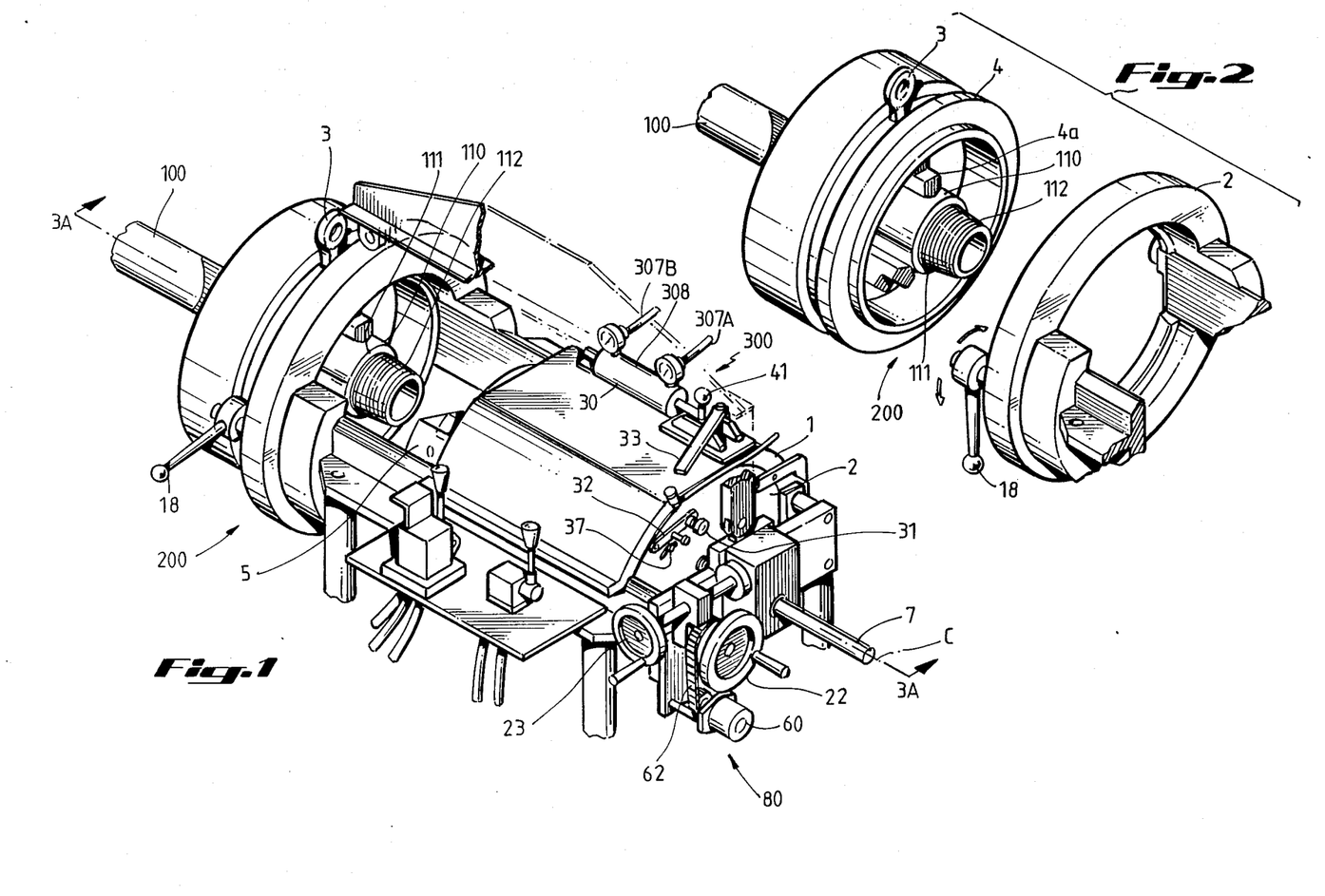
FIG. 1 is a perspective view of the invention in relation to a standard section of drill pipe.
FIG. 2 is a detail perspective view of one embodiment of the pipe retaining means as it may be situated relative to the machine body.

FIG. 1 is an external perspective view of the present invention as it is seen in relation to a pipe section 100. Generally, the apparatus is comprised of three main components including a frame 1, a body 2, and a pipe holder or retaining means 200. The body 2 itself is slidably disposed within frame 2 on a grooved track set-up (not shown) such that body 2 may move longitudinally relative to the frame 1 toward the pipe retaining means 200. This longitudinal movement is accomplished by a main drive motor 92 attached to the frame 1 and engagingly coupled to external gear assemblies disposed within the body 2. (See FIG. 7) Alternatively, this longitudinal movement may be accomplished via a secondary feed assembly 80 comprised of a motor 60 coupled to longitudinal feed handwheel 22 via a chain 62 or other means. Longitudinal movement of the body 2 may also be accomplished manually via handwheel 22. In these views may also be seen cross feed handwheel 23 in relation to main shaft 7. Manual rotation of handwheel 23 results in rotation of shaft 7, which is engagingly coupled to tool holders or blocks 5. Tool blocks 5, in turn, are radially disposed relative central axis C, such that the rotation and thus longitudinal movement of shaft 7 results in transverse movement of tool blocks 5 relative to the central axis.

Referring to both FIGS. 1-2 and FIGS. 13-14, the pipe retaining means 200 is generally comprised of a chuck 4 having jaw assembly 4A, such as to hold a pipe end 110 relative the body 2 such that central axis C and the axis of the pipe 100 are substantially coincidental. Preferably, the pipe 100 is positioned in said retaining means 200 such that pipe pin 112 and shoulder 111 extend beyond chuck 4 into engagement with tool blocks 5. Retaining means 200 is detachably coupled to frame 1 and body 2 via quick release cams 18.

Figure 3A:
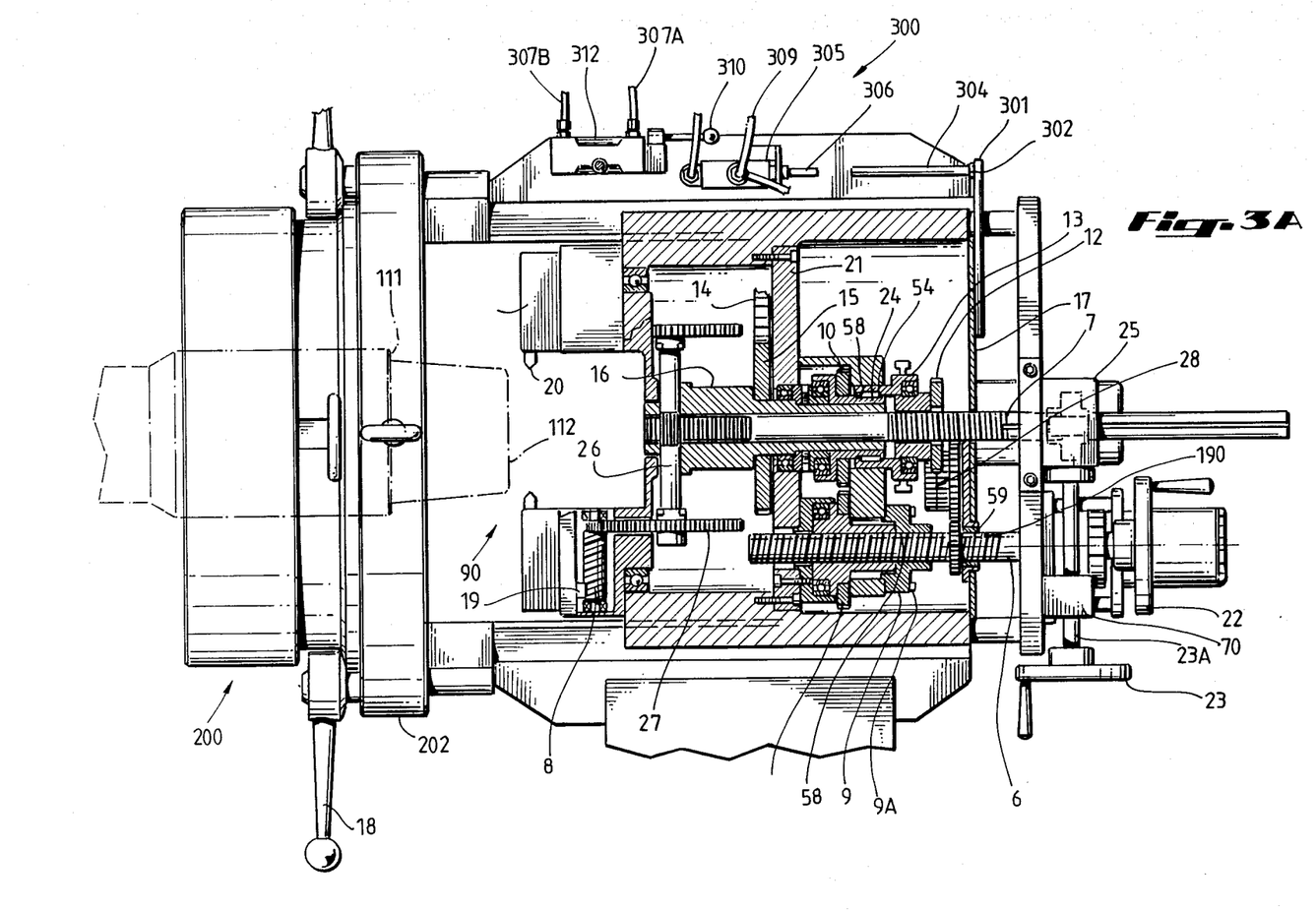
FIG. 3A is a cross section detail view as taken along plane 3—3 in FIG. 1.
Figures 3B, 13, 14:
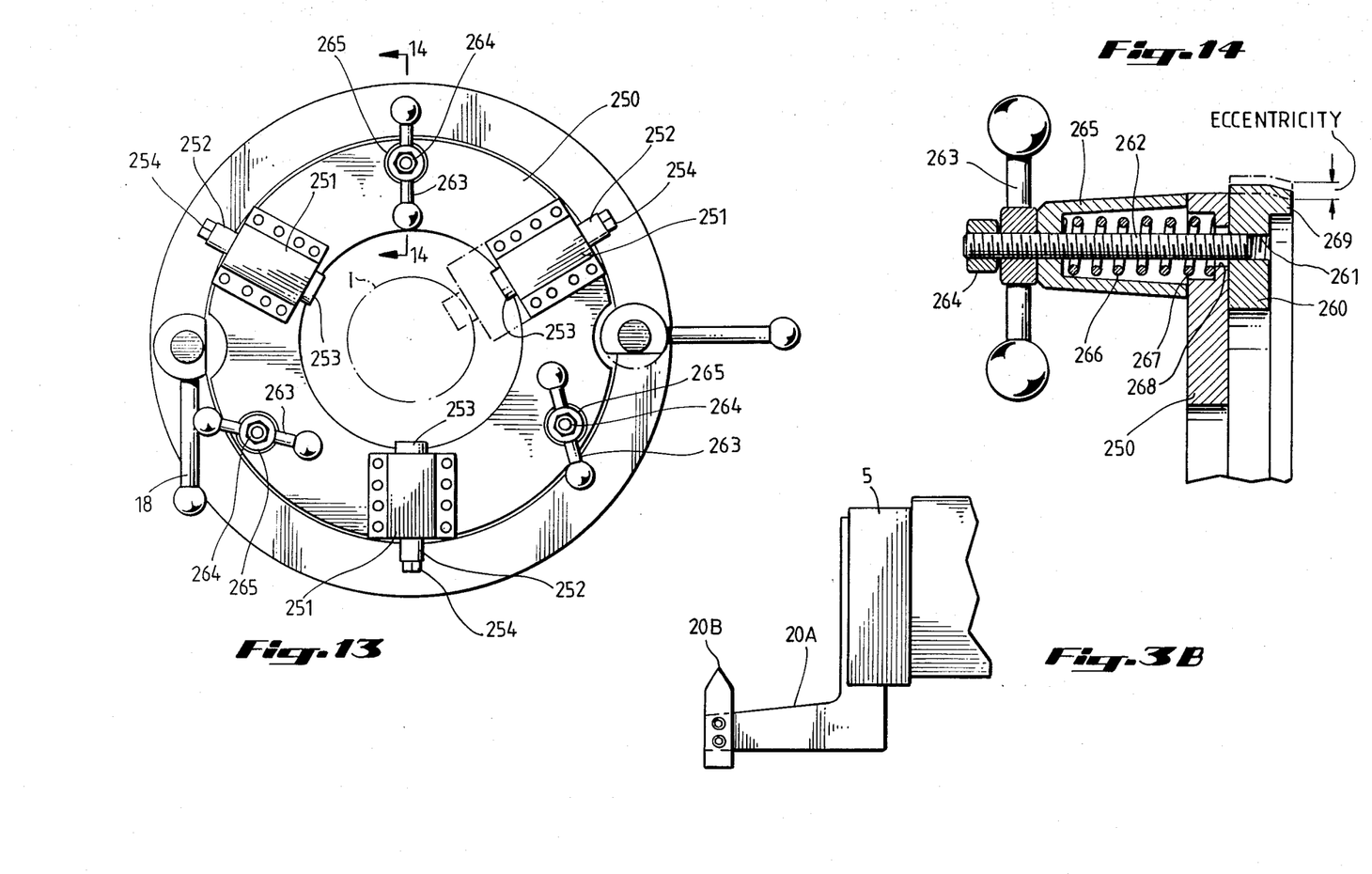
FIG. 3B is a detail side view of the cutting tool assembly adapted to cut a female thread.
FIG. 13 is an end view of a second embodiment of the attachment means.
FIG. 14 is a detail view of a portion of the attachment means shown in FIG. 13.

Referring to FIGS. 13 and 14, in one embodiment pipe retaining means 200 includes a circular housing base 202 and a jaw assembly 4A which is attachable to the pipe section 100 independent of the body 2 and frame 1. As best seen in FIGS. 13–14, the jaw assembly 4A comprises a circular jaw plate 250 attached to which is a plurality of jaw carriers 251 in each of which is carried a jaw screw 252 at the end of which is jaw 253. Rotation of the jaw screws 252 by engagement of a wrench with wrench flats 254 causes the jaws 253 to move radially inwardly or outwardly, depending upon the direction of rotation of the jaw screws 252.

Also attached to the jaw plate 250 is a circular base plate 260. A plurality of radial holes 261, (see FIG. 14) around the circular base plate 260 receive the threaded end of a stud 262 the opposite threaded end of which carries a locking handle 263 and lock nut 264. The stud 262 extends through a cone member 265 in which is housed a spring 266 which surrounds the stud 262, one end bearing against the cone 265 and the other being received within a counterbored portion 267 of a hole 268 in the jaw plate 250. The hole 268 is of larger diameter than the external diameter of stud 262 so that when the handle 263 is loosened, a slight amount of eccentricity is permitted between the jaw plate 250 and the circular base plate 260. However, upon tightening of the handles 263 against the cone 265, the jaw plate 250 and circular base plate 260 are rigidly held in a fixed relationship. Tightening down of the lock nut 264 maintains this fixed relationship.

Figure 4A:
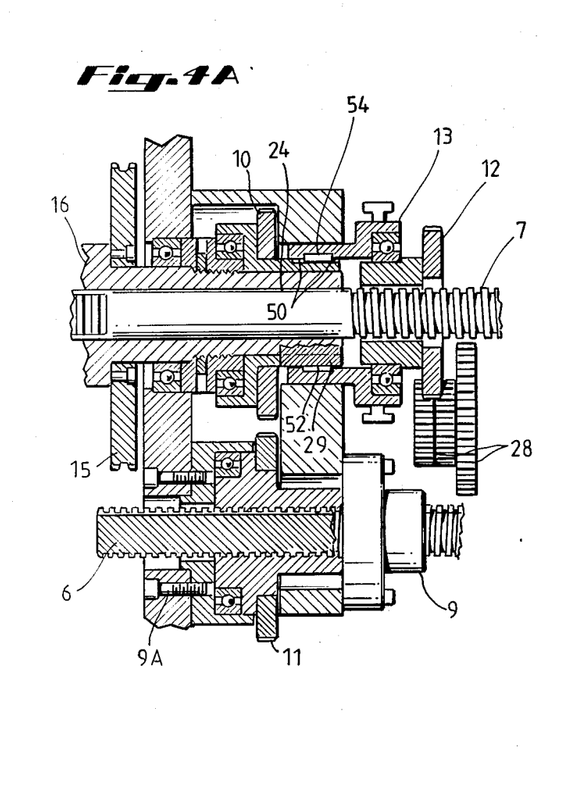
FIG. 4 is a detail view of FIG. 3A illustrating the relationship of the main shaft to the lead screw.
Figure 5:
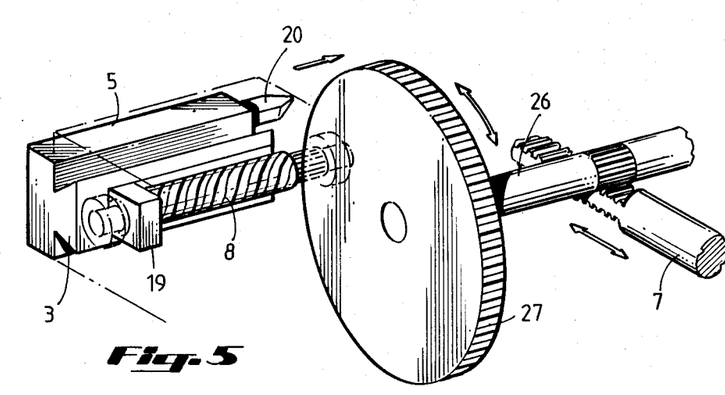
FIG. 5 is a detail perspective view of the radial feed means.
Figure 6:
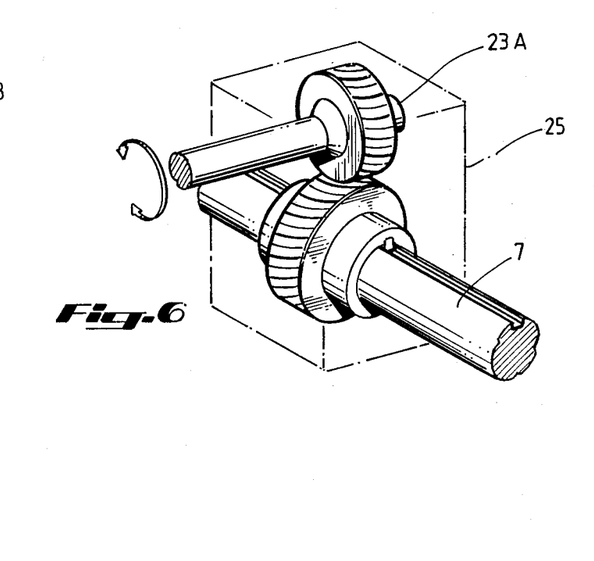
FIG. 6 is a detail perspective view of the radial feed handwheel as it intersects the main shaft.

FIGS. 3 and 4 represent a cross section of body 2, frame 1 and retaining means 200 illustrating the working interrelationship of the aforedescribed components. In these views may be seen the main shaft 7 relative the frame 1. Referring to both FIGS. 3A and 5, shaft 7 is rotatably disposed through frame 1 into mesh engagement with a radial feed means, said means comprising a cross feed shaft 26 coupled to cross feed gear 27 engaging feed screw 8. Feed screw 8 is fixedly attached to tool blocks 5, such that transverse movement of said tool blocks 5 and hence cutting tool 20 is effected upon longitudinal movement of the main shaft 7 relative frame 1. In this view may also be seen the interrelationship of cross feed handwheel 23 and cross feed shaft 23A to main shaft 7 through cross feed gear box 25. A detail view of the engagement between cross feed shaft 239 and shaft 7 is seen in FIG. 6.

Figure 7:
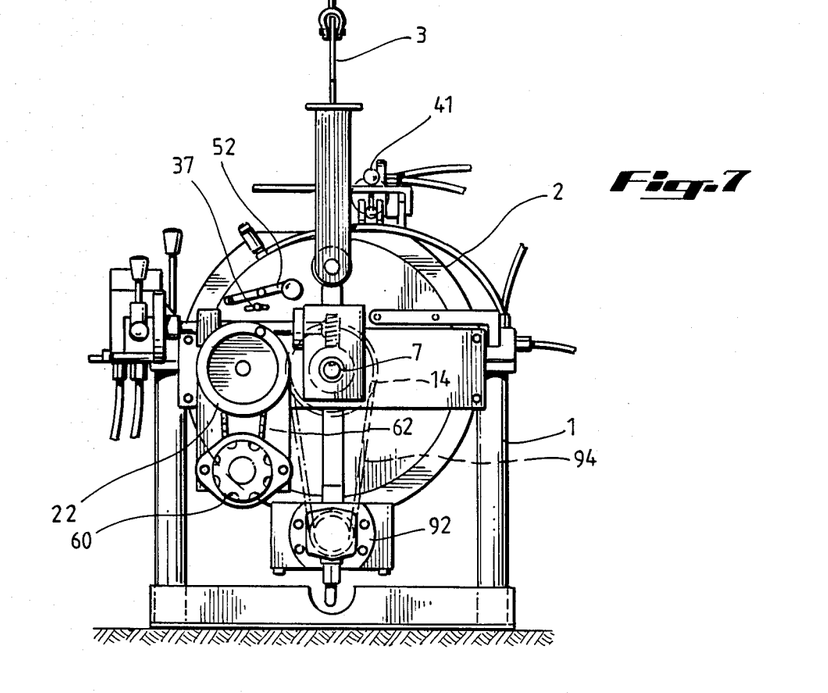
FIG. 7 is an end view of the inventionillustrating the position of the main and auxiliary drive motors.

As noted, longitudinal movement of the body 2 relative to the frame may be accomplished in multiple fashions. Primary movement of body 2 is accomplished via a first drive train or linear feed means comprised of a main drive motor 92 operatively linked to lead screw 6. Referring to FIGS. 3–4 and 7, operative engagement is accomplished as the drive motor 92 engages main drive sprocket 14 which is operatively linked to internal drive sprocket 15 by a roller chain 94 or the like. Sprocket 15 in turn is linked to spindle 16, which results in the rotation of tool 20. Also seen in FIGS. 3–4 and 7 is secondary feed assembly 80 comprised of lead screw 6 coupled to longitudinal feed handwheel 22. As noted, handwheel 22 may be coupled to a drive motor 60 or may be operated manually to induce longitudinal movement of body 2 relative to frame 1.

Referring again to FIG. 3, cutting tool assembly 90 is comprised of tool blocks 5 rotatably mounted on main shaft 7 about central axis C in diametrically opposed fashion. A cutting tool 20 is fixedly disposed in either tool block 5, such that upon transverse, inward movement of blocks 5, the tool 20 may be brought into cutting engagement with pin 112 or shoulder 111. Preferably, tool blocks 5 are equally weighted in order to balance cutting tool assembly 90 upon rapid rotation about pin end 110. Tool 20 as illustrated in FIG. 3 is adapted to cut a male or outside thread. As seen in FIG. 3B, when a female or inside thread is desired, tool 20 is replaced with boring bar 20A which carries tool 20B.

Preparatory to cutting a thread on pipe end 110, end 110 must be cut or roughed to a desired working diameter. This is generally accomplished via cutting tool 20. In preferred embodiments of the present device, two linear feed speeds are available to finish a threaded pipe pin or box 112. For preliminary cutting operations, the linear feed means may be set in a reduced gear ratio relative the rotation of the tool blocks 5, hence translating a slower longitudinal feed rate to the cutting tool assembly 90. In situations where a thread is to be cut on the pipe end 110, the linear feed means is up-geared to establish a one-to-one gear ratio with the lead screw 6. In this setting, the cutting tool assembly rotates at the rotational rate of lead screw 6. This gearing is accomplished via a second drive train or translation means 800.

Figure 11:
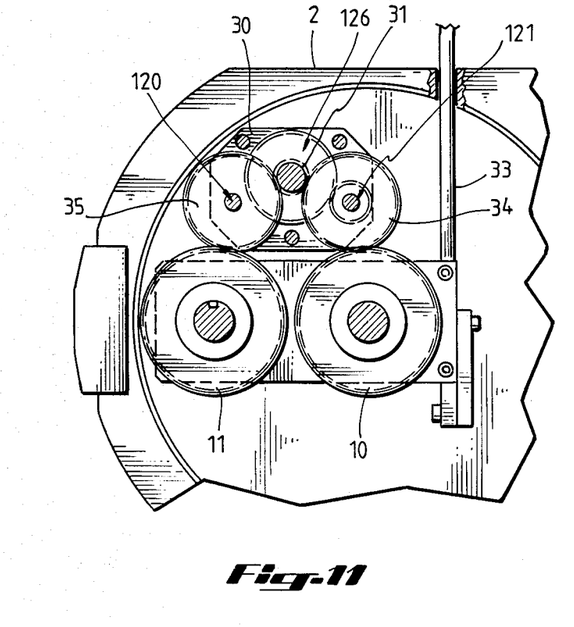
FIG. 11 is an end cutaway view illustrating the placement of the translation means in relation to the primary and secondary feed gears.
Figures 12A, 12B:
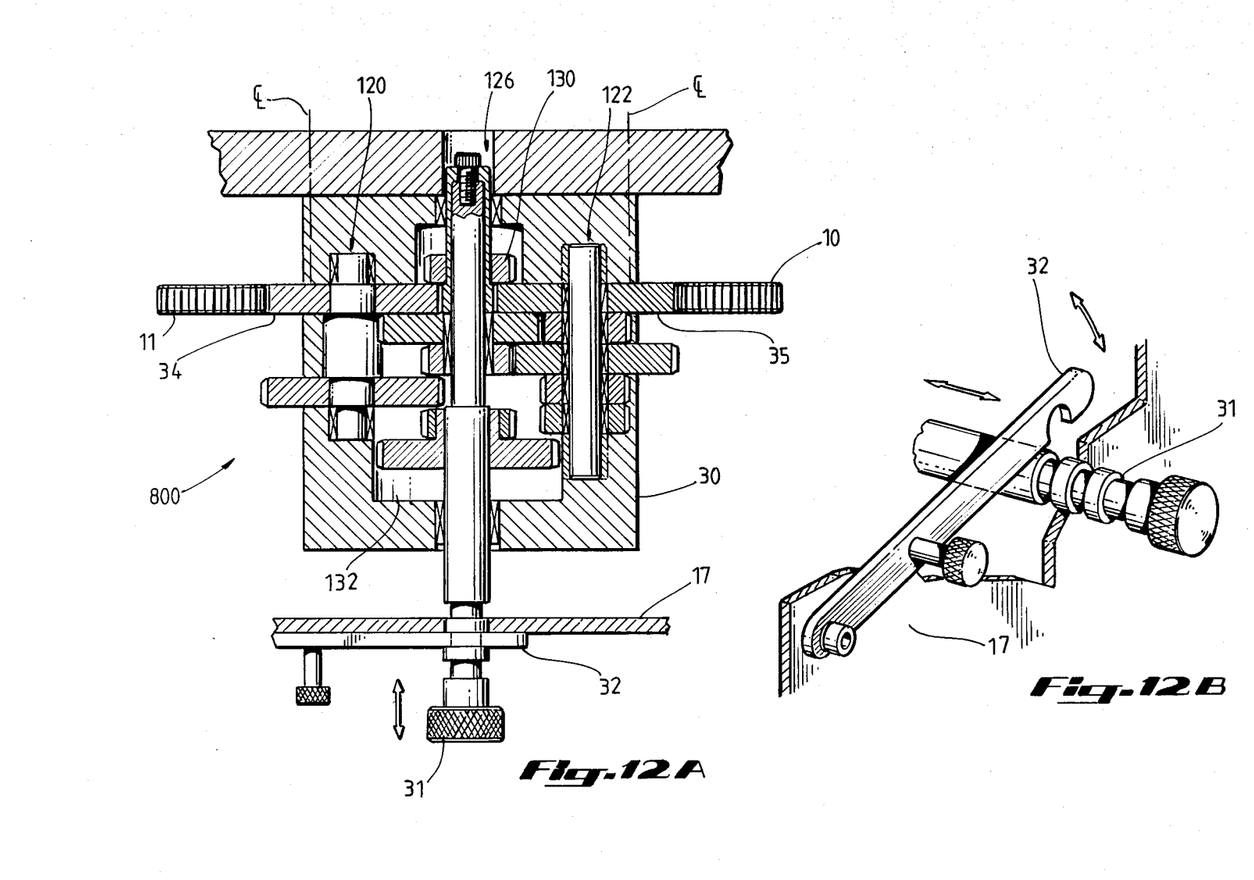
FIG. 12A is a detail top view of the translation means as it may be situated in the body.
FIG. 12B is a detail view of the selector shaft and locking lever of the translation means.

Referring to FIGS. 11, 12A and 12B, the translation means 800 itself is generally comprised of a reduction gear assembly 30 operable by selector shaft 31, said gear assembly 30 being disposed in the body 2 in operative engagement with lead screw 6. Shaft 31 is slidably disposed through the body 2 into gear assembly 30. Gear assembly 30 includes gear cluster 120 and 122, said clusters operably aligned with primary feed gear 10 and secondary feed gear 11 via output gear 35 and input gear 34, respectively. A floating gear cluster 126 is rotatably disposed on selector shaft 31, said gear cluster 126 having at least two subgear assemblies 130 and 132. In such a fashion, gear cluster 126 may establish two or more engaging positions between input gear 35 and output gear 34, such that a variety of gear ratios may be created between primary gear 10 and secondary gear 11.

Thus, when selector shaft 31 is moved forward, or in the "on" position, gear 132 is carried forward into engagement with gears 35 and 34, thus establishing a reduced gear ratio. This is the preferred position of selector 31 when cutting or roughing of the pipe end 110 is desired. When the selector 31 is positioned in the middle or "neutral" position relative to gear clusters 120 and 122, no engagement is established between primary gear 10 and secondary gear 11; thus the cutting tool 20 does not feed linearly. When a thread is to be cut on the pipe end 100, the selector 31 is pulled into the "out" position, thus engaging gear 130 between gears 34 and 35 such that the rotation of spindle 16, and hence primary gear 10, is translated to secondary feed gear 11. In this position, the rotational velocity of lead screw 6 mirrors the rotational velocity of cutting tool 20 such that a one-to-one ratio is established.

The fabrication of a straight or linear male pin may be thus described as follows by reference to FIGS. 1–14. A lead screw 6 with the desired pitch of the thread that is to be cut on the pipe pin 112 is installed into the body 2 of the machine and rotatably secured to the frame 1 via a retaining collar 70. Since a straight thread requires no taper of the pipe end 110, the taper assembly 28 is rotated into an "out" position so that the gears of said assembly 28 are disengaged from the main shaft gear nut 12. When thus adjusted, the taper assembly 28 is locked in position by lock screw 37. To additionally prevent the inadvertent rotation of the main shaft 7, gear nut 12 is locked with an antirotation pin (not shown). The machine is thus prepared to establish a straight or linear cut surface on the pipe end 110 prepatory to threading.

Pipe section 100 is then inserted and centered in the pipe retaining means 200 comprising chuck 4 and retaining jaw assembly 4A. The working diameter of the cutting tool 20 is then established to a desired value relative to the pipe end 110 by manually rotating handwheel 23 which is operatively engaged with main shaft 7. Assuming a right angle gear box 25 is used, the rotation of handwheel 23 causes shaft 7 to turn in a clockwise direction, thus inducing longitudinal movement of main shaft 7 about gear nut 12, which is now locked in a disengaged position relative to taper assembly 28. Longitudinal movement of main shaft 7 induces the rotation of cross feed shaft 26 due to grooved, mesh engagement therebetween. The rotation of cross feed shaft 26 results in the rotation of cross feed gear 27, which in turn engages feed screw 8. (See FIG. 5) Thus rotated, feed screw 8 pulls against feed screw nut 19 attached to mounting block 5, such that mounting block 5 is transversely urged relative the central axis C to establish a desired working diameter of cutting tool 20. Preferably this cutting diameter is only marginally less (in the order of ⅛") than the outside diameter of the pipe end 110 so as to prevent "tearing" of the pipe surface, and also to prevent possible breakage of cutting tool 20.

Once rotation of cutting tool 20 is established by engagement of drive motor 92, the body 2 is longitudinally moved forward relative to pipe end 110 by rotating handwheel 22, which, as noted, is connectedly attached to lead screw 6. Lead screw 6 is threadedly disposed in the body 2 parallel to central axis C, said lead screw 6 also being fixedly coupled to frame 1. In such a fashion, when the lead screw 6 is turned in a clockwise direction, the body will be urged longitudinally away from the distal portion of said frame 1 toward the pipe retaining means 200. Thus, the orbiting cutting tool 20 may be brought into working engagement with the pipe end 110 such as to cut away all metal in excess of the diameter previously established by manipulation of handwheel 23.

As noted, a main drive motor 92 accomplishes the rotation of the cutting tool assembly 90 relative the body 2. (See FIG. 7) This same motor results in the longitudinal movement of the body 2 relative to the frame 1. The translation of this rotational motion to a linear motion is accomplished via a linear feed means. In operation, this automated linear feed is accomplished by engaging feed clutch 24 via clutch arm 33. (See FIGS. 3A and 10.) Feed clutch 24 is driven by spindle 16 via key 29 engaging internal longitudinal slot (not shown) inside of clutch 24. Feed clutch 24 has two external longitudinal slots 50 cut from either side of annular groove 52. Feed clutch 24 will not fully engage until these longitudinal slots 50 in said clutch 24 are aligned with the internal key 54 in the primary feed gear 10. As the spindle 16 rotates, feed clutch 24 also rotates such that external slots 50 in said clutch 24 come into alignment with internal key 54 in the primary feed gear 10. Thus aligned, clutch 24 is able to slide into and fully engage, thus rotating primary feed gear 10. At this time input gear 34, disposed in reduction gear assembly 30 also rotates. (See FIGS. 11 and 12.) Since selector shaft 31 is held forward by lock lever 32, output gear 35 also rotates. The rotational speed of this gear 35 however is greatly reduced relative to the cutting tool assembly 90 due to the series of reduction gears situated in gear box 30. Output gear 35 in turn engages secondary feed gear 11 which drives lead screw 6 via an internal key 58 which travels along a slot 90 cut along the side of lead screw 6. Thus while the cutting tool assembly 90 may establish a relatively gradual linear feed speed relative the frame 1 and pin 112, the handwheel 22 turns relatively slowly. Therefore, upon engagement of clutch 24 the body 2 will slowly move toward the pipe end 110 until the clutch 24 is disengaged via lever 33.

Figure 10:
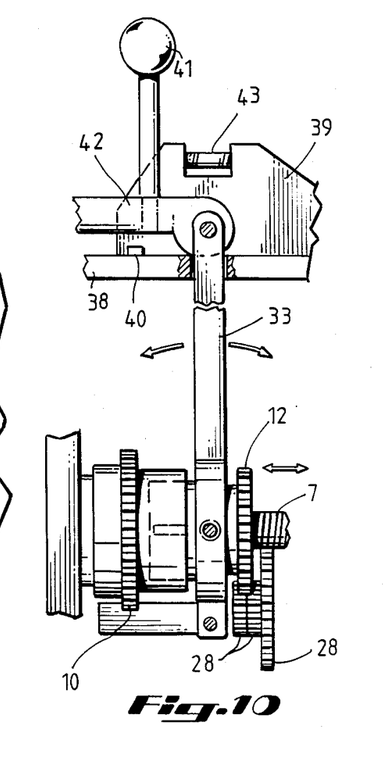
FIG. 10 is a side view of the main shaft illustrating the position of the clutch and clutch lock assembly.

Referring to FIGS. 1 and 10, when clutch 24 is engaged through clutch arm 33, arm 33 must be secured to prevent inadvertent or otherwise undesired disengagement as caused by reactive forces generated by the contact of cutting tool 20 about pipe end 110. Clutch 24 is locked in engagement with primary feed gear 10 by locking clutch arm 33. This is accomplished by pushing shift knob 41 forward toward chuck 4, which in turn moves shifting eye 42. Moving eye 42 preloads spring 43 on the forward side of said eye 42, causing lock carrier 39 to be urged counterclockwise. Thus when lock carrier 39 is slid forward, locking gear 40 drops down so as to engage catch lock plate 38. Clutch 24 is now locked in place. When disengagement of clutch 24 is desired, spring 43 is backloaded, resulting in a counterclockwise rotation of lock plate 38, resulting in the disengagement of lock gear 40. Thus disengaged, the entire assembly is free to be moved in to a neutral position.

Referring to FIGS. 3 and 10, when clutch lever 33 is moved so as to disengage clutch 24, the working orbital diameter of the cutting tool 20 is automatically increased to a nonengaging position relative pipe pin 112. This is caused because the disengagement of the clutch 24 results in a longitudinal movement of the main shaft 7 in a withdrawn direction from the pipe end 110. Simultaneously with the disengagement of clutch 24, the primary feed gear 10 is also released. In such a fashion, the cutting tool 20 is disengaged from the work face or pin 112 such that it may be longitudinally withdrawn manually by handwheel 22. Alternatively, the cutting tool 20 may be automatically withdrawn by the secondary feed assembly 80.

As noted in reference to FIG. 1, the secondary feed assembly generally comprises a drive motor 60 carried by said frame 1, said motor 60 operatively coupled to the lead screw 6 via a drive chain 62 or the like. (See FIG. 7) Utilizing this secondary feed assembly, the body 2 may be moved in a longitudinal direction relative to the frame 1; such assembly thereby providing a means for realigning the cutting tool assembly 90 relative to the pipe end 110 after a particular "pass" has been made.

The above described disengagement of clutch 24 may also be effected automatically by an automatic disengagement means 300. In preferred embodiments of the invention, an automatic disengagement assembly 300 may be coupled between the frame 1 and the body 2 such that upon selected longitudinal travel of the body 2 relative the frame 1, the clutch 24 is automatically disengaged. In this fashion, the length of the pin or box 112 and hence the exact length of a particular thread is easily duplicated in a given pipe section 110 thus facilitating the threading or cutting process. Further, such an automatic cutoff results in a uniform threading or resurfacing operation among a number of different pipe sections.

Disengagement means 300 may be seen by reference to FIGS. 1, 3A and 10, and is generally comprised of a pneumatic cylinder 308 coupled to body 2, said cylinder coupled to connectors 307A and 307B. Connectors 307A and 307B are connected at their terminal end to frame 1 via a connector box 312, which in turn is operated via selector switch 310. Cylinder 308 is operatively coupled to clutch arm 33 by valve 305 operated via push switch 306. Valve 305 is fixedly attached to frame 1. A push rod 304 is slidably disposed through bracket 301 secured to the end of the body 2, said push rod 304 securable by a thumbscrew 302 or other means. Push rod 304 is also axially aligned with push switch 306 such that upon longitudinal movement of body 2 about frame 1, push rod 304 will activate push switch 306 thus activating push valve 305. When activated, valve 305 allows air from an external air tank (not shown) supplied by hose 309 to enter connector box 312. As determined by the operating position of selector switch 310, air is then allowed to enter cylinder 308 atop body 2 resulting in disengagement of clutch lever 33, and thus clutch 24. The body can then be longitudinally withdrawn via handwheel 22. This automatic motion also releases push valve 305 which closes off compressed air via connector 309, thus allowing compressed air in cylinder 308 to escape such that clutch 24 may be again engaged. In this fashion, by varying the length of push rod 304, a thread of a desired length may be fabricated on pipe end 110. This length may be duplicated for each "pass" necessary in a cutting or threading process.

After the desired diameter of the pin 112 has been established, the apparatus is next readied to cut the desired thread pattern in said pin 112. To establish a desired thread, the selector shaft 31 is pulled back to an "out" position and held by lock lever 32. (See FIG. 12.) The reduction gear assembly box 30 is now established in a one-to-one ratio between primary feed gear 10 and secondary feed gear 11 by manipulation of selector shaft 31. When the clutch 24 is thus engaged, the main shaft 7 resumes its original radial position, thus re-establishing the afore-selected working orbital diameter of the cutting tool 20 relative to pipe end 110. The cutting tool 20 is then moved longitudinally forward onto pin 112. In this one-to-one gear alignment, a corresponding revolution of the handwheel 22 follows each revolution of the cutting tool 20 about the pipe end 110. In this fashion, the cutting tool 20 cuts a thread on the pin 112 corresponding in pitch to the pitch of the lead screw 6. When the tool 20 has made the desired number of revolutions on the pin 112 resulting in the desired length of the thread, the clutch 24 is manually disengaged via lever 33 disengaging feed gear 10, thus retracting the tool 20 from engagement with the pipe end 110. The body 2 and thus the cutting tool assembly itself 90 may now be manually withdrawn from the pipe end 110 by turning lever 22. Alternatively, the body may be automatically withdrawn via engagement of the secondary feed assembly 80.

Due to the compact, portable nature of the present device, the cutting tool 20 generally cannot establish the full desired depth of a thread or cut in one application along the pipe end 110. This is due to the inherent strain associated with this process which would probably result in damage to the tool 20. Additionally, an attempt to initially create too deep a thread in a pipe shoulder generally results in a greatly reduced rotational speed of the tool 20 about the pipe end 110. Since the use of carbide cutting tools usually demands relatively high rotational speed (in the order of 300 surface feet per minute), slower rotational velocities often result in poor quality thread formation since at a lower speed the cutting tool 20 is often prone to "tear" instead of cleanly cut the metal. As a consequence, multiple "passes" or "cuts" are generally required to fabricate a thread of proper depth and finish, each of these cuts producing a progressively deeper thread. This depth increase is accomplished by decreasing the working orbit of the cutting tool 20 by manually adjusting handwheel 23. Using the aforedescribed automatic disengagement assembly 300, this multiple "pass" process is greatly facilitated with little or no chance of overrunning a given thread.

The fabrication of a tapered pin or box 112 generally involves much of the procedure and mechanical interrelation previously described. In order to achieve a tapered pipe end, the taper gear assembly 28 must be brought into operative engagement with the main shaft gear nut 12 such that the main shaft gear nut 12 may move relative the lead screw 6. This engagement may be effected by pivoting taper gear assembly 28 about lead screw 6 until the outside set of reduction gears 500 mesh with both the main shaft 7 and lead screw 6. (See FIG. 9) When a proper mesh is thus achieved, the gear assembly base plate 504 is locked into position with lock screw 37.

Figure 9:
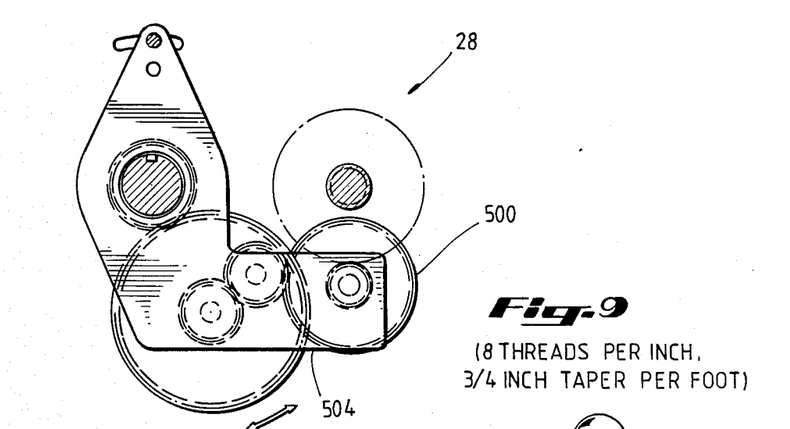
FIG. 9 is a detail view of the taper gear assembly shown in FIG. 8.

When the taper assembly 28 is thus engaged, the movement of handwheel 22 results in the longitudinal movement of the body 2 toward the pipe end 110 and the relative longitudinal movement of shaft 7. This results because the slot 190 formed along the side of the lead screw 6 turns the outside reduction gears 500 on the taper gear assembly 28, which in turn rotates the main shaft gear nut 12. The movement of gear nut 12 results in the longitudinal movement of main shaft 7 which results in a graduated, radial movement of the tool block 5 as it moves longitudinally down the pipe end 110, thus resulting in a tapered pin 112 having a spiral thread pattern.

Figure 8:
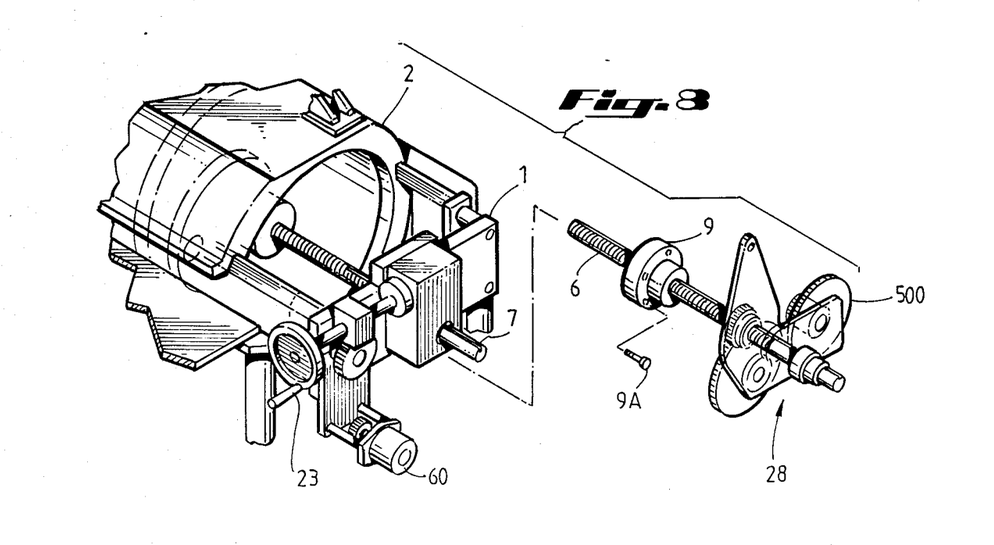
FIG. 8 is a perspective view illustrating the relative position of the taper gear assembly as it may be inserted in the body.

The present apparatus is adapted to form a variety of tapers and/or thread patterns on a pipe end by the replacement of an interchangeable gear assembly. Referring to FIG. 8, to interchange gear assembly 28 and/or lead screw 6, the body 2 is first moved longitudinally across frame 1 to a position in close proximity with pipe retaining means 200. This axial movement may be achieved by turning feed hand wheel 22 or by operation of secondary feed assembly 80. Once body 2 is situated at the frontal portion of the frame 1, fasteners in back cover 17 and retaining collar 70 are removed, and cover 17 and collar 70 pulled back exposing lead screw nut 9. Fasteners 9A in lead screw nut 9 are then removed. Handwheel 22 is then rotated counterclockwise to disengage lead screw 6 from engagement with nut 9 and taper assembly 28. Depending on desired cutting characteristics of tool cutting assembly 90, the lead screw 6 and lead screw nut 9 may both be interchanged. Additionally or alternatively, taper assembly 28 may also be interchanged.

As previously noted, the present system is adapted to cut both male and female threads. In order to cut a female or inside thread, the lock screw 37 is loosened, and the taper gear 28 pivoted until the inside gear set (not shown) meshes with main shaft 7 and lead screw 6. Once a proper mesh has been established, lock screw 37 is tightened. The pivoting of the taper assembly in this fashion reverses the rotation of main shaft gear nut 12. Thus, the rotating tool 20 now decreases in diameter as it longitudinally advances along the pipe end 110. When the tool has achieved a proper thread length, the clutch 24 is disengaged, pulling the main shaft 7 back from the work face 112. In this gear orientation, however, the cutting tool 20 moves radially in from the interior surface of the pipe end 110, so that the body 2 may be longitudinally withdrawn and the cutting or threading process repeated.

What is claimed is:

1. A portable apparatus for resurfacing or rethreading pipe, comprising:
a main frame;
a body mounted within and longitudinally movable relative to said main frame, said body comprising a main shaft, a linear feed means, and a taper assembly, said main shaft carried by said body for rotation and longitudinal movement relative to a central longitudinal axis C, said taper assembly operatively disposed between said linear feed means and said main shaft such as to translate linear movement of said linear feed means to axial movement of said main shaft, said taper assembly being adjustable between an engaging and a nonengaging position relative said main shaft and said linear feed means; said linear feed means adapted to move the body longitudinally relative the frame;
attachment means for detachably securing said frame to the end of said pipe so that the central axis C and the axis of the pipe are substantially coaxial;
a cutting tool assembly comprising a tool mounting means and a radial feed means, said tool mounting means rotatably coupled to said body to rotate relative to the body, said radial feed means operatively disposed between the main shaft and the tool mounting means to move the tool mounting means radially relative to the central axis in response to longitudinal movement of said shaft relative to the body.

2. The portable apparatus of claim 1 where when the taper assembly is positioned in nonoperative engagement with said main shaft and said linear feed means, the cutting tool assembly is forced to follow a linear path upon operation of said linear feed means and rotation of said main shaft, so as to produce a linear or straight cutting surface on the pipe end.

3. The portable apparatus of claim 1 where when the taper assembly is positioned in operative engagement with said main shaft and said linear feed means, the cutting tool assembly is forced to follow a linear path inclined from said central axis upon operation of said linear feed means and rotation of said main shaft, so as to produce a tapered cutting surface on the pipe end.

4. The portable apparatus of claim 1 where the radial feed means comprises mounting members operatively disposed through mutually engageable guide surfaces therebetween, a first member rotatably engageable to said main shaft, a second member threadedly engageable to said tool mounting means, a third mounting member directly engageable to said main shaft and manually operable through mutually connecting means to induce rotational motion to said main shaft, the rotation of said third member or the longitudinal movement of said main shaft resulting in transverse movement of the tool mounting means relative to the central axis.

5. The portable apparatus of claim 1 wherein the linear feed means comprises a drive motor, a lead screw, and mounting members operatively disposed through mutually engageable guide surfaces therebetween, said drive motor operatively engaged to a first member, a second mounting member detachably engageable to said lead screw, the combination drive motor, lead screw and mounting members such that upon engagement of the lead screw by the second member, the body is moved longitudinally along the frame.

6. The portable apparatus of claim 5 where the pitch of a thread cut on the pipe may be modified by the replacement of the lead screw.

7. The portable apparatus of claim 1 further comprising a secondary feed assembly, said assembly comprising a drive motor operatively engaged to said lead screw such as to provide a means for inducing longitudinal movement of the body within the frame independent of said linear feed means.

8. The portable apparatus of claim 1 where said linear feed means is operable independently of said radial feed means.

9. The portable apparatus of claim 8 including an annular groove carried on one of said circular base plate and said frame and an annular lip carried on the other cooperatively engageable, upon attachment of said housing base to said jaw assembly, to coaxially align said pipe end and said main shaft.

10. The portable apparatus of claim 9 in which said circular base plate is affixed to said jaw assembly for limited radial movement as to allow concentric alignment of said base plate with said pipe end even when the remainder of said jaw assembly is not concentrically aligned therewith.

11. The portable apparatus of claim 1 in which said attachment means for attaching said frame to the end of a pipe comprises a jaw assembly attachable to said pipe end independently of said frame and including a circular base plate for concentric alignment with said pipe end, said attachment means also comprising a circular housing base affixed to said housing means and the center of which coincides with said main shaft central axis, said housing base being attachable to said jaw assembly, after attachment of said jaw assembly to said pipe end, so that said central axis and said pipe axis are substantially coincidental.

12. The portable apparatus of claim 11 in which said jaw assembly includes a plurality of radially movable jaws engageable with said pipe and for said attachment thereto.

13. The portable apparatus of claim 1 further including an automatic disengagement means for transverse withdrawal of the cutting tool from the pipe end when a certain length thread is cut on said shoulder.

14. The portable apparatus of claim 1 where the taper means includes two operative engaging positions, one position adapted to cut a female thread, the other position adapted to cut a male thread.

15. The portable apparatus of claim 1 further including a radial adjustment means such that transverse movement of the mounting block relative the central axis may be achieved independent of the radial feed means. independently of said frame and including a circular base plate for concentric alignment with said pipe end, said attachment means also comprising a circular housing base affixed to said housing means and the center of which coincides with said main shaft central axis, said housing base being attachable to said jaw assembly, after attachment of said jaw assembly to said pipe end, so that said central axis and said pipe axis are substantially coincidental.

16. A portable apparatus for resurfacing or rethreading pipe, comprising:
   a main frame;
   a body mounted within and longitudinally movable relative to said main frame, said body comprising a main shaft, a linear feed means, and a taper assembly, said main shaft carried by said body for rotation and longitudinal movement thereabout a central longitudinal axis C, said taper assembly operatively disposed between said linear feed means and said main shaft such as to translate the linear movement of said linear feed means to axial movement of said main shaft, said linear feed means adapted to move the body longitudinally relative the frame, said taper assembly being adjustable between an engaging and a nonengaging position relative said main shaft and said linear feed means; said linear feed means further including a lead screw threadedly engaging said body and rotatably disposed relative said frame,
   a cutting tool assembly comprising a tool mounting means and a radial feed means, said radial feed means operatively disposed between said main shaft and said tool mounting means, said tool mounting means rotatably coupled to said body about the central axis, such that when the main shaft is moved longitudinally about the central axis, the tool mounting means undergoes transverse movement relative said axis;
   said linear feed means further comprising a translation means disposed between said lead screw and said tool mounting means, said translation means adjustable between at least a first and a second position such that the rotational speed of the cutting tool assembly to be varied with respect to the rotational velocity of said lead screw.

17. The portable apparatus of claim 16 where when the taper assembly is positioned in nonoperative engagement with said main shaft and said linear feed means, the cutting tool assembly is forced to follow a linear path upon operation of said linear feed means and rotation of said main shaft, so as to produce a linear or straight cutting surface on the pipe end.

18. The portable apparatus of claim 16 where when the taper assembly is positioned in operative engagement with said main shaft and said linear feed means, the cutting tool assembly is forced to follow a linear path inclined from said central axis upon operation of said linear feed means and rotation of said main shaft, so as to produce a tapered cutting surface on the pipe end.

19. The portable apparatus of claim 16 where the radial feed means comprises mounting members operatively disposed through mutually engageable guide surfaces therebetween, a first member operatively engageable to said main shaft, a second member threadedly engageable to said tool mounting means, the rotation of said first member inducing longitudinal movement of said main shaft relative said tool mounting means resulting in transverse movement of the tool mounting means relative to the central axis.

20. The portable apparatus of claim 16 where said translation means is comprised of a reduction gear assembly such as to effect a differential rotational velocity in said first and second position between the rotation of said lead screw and the rotation of said tool mounting means.

21. The portable apparatus of claim 16 where said linear feed means is operable independently of said radial feed means.

22. The portable apparatus of claim 16 where the pitch of a thread cut on the pipe may be changed by the replacement of the lead screw.

23. The portable apparatus of claim 16 further including an automatic disengagement means for transverse withdrawal of the cutting tool from the pipe end when a certain length thread is cut on said shoulder.

24. The portable apparatus of claim 16 where the taper means includes two operative engaging positions, one position adapted to cut a female thread, the other position adapted to cut a male thread.

25. The portable apparatus of claim 16 further comprising a secondary feed assembly, said assembly comprising a drive motor operatively engaged to said lead screw such as to provide a means for inducing longitudinal movement of the body about the frame independent of said linear feed means.

26. A portable apparatus for resurfacing or rethreading pipe, comprising:
   a main frame;
   a body longitudinally movable relative to said main frame, said body comprising a main shaft, a linear feed means, and an interchangeable taper assembly, said main shaft carried by said body for rotation and longitudinal movement therein about a central longitudinal axis C, said taper assembly operatively disposed between said linear feed means and said main shaft such as to translate the linear movement of said linear feed means to axial movement of said main shaft, said linear feed means adapted to move the body longitudinally relative to the frame, said taper assembly being adjustable between an engaging and a nonengaging position relative said main shaft and said linear feed means, said linear feed means including a lead screw threadedly engaging said body and rotatably disposed relative said frame;
   attachment means for detachably securing said frame to the end of said pipe so that the central axis and the axis of the pipe are substantially coaxial;
   a cutting tool assembly comprising a tool mounting means and a radial feed means, said radial feed means operatively disposed between said main shaft and said tool mounting means, said tool mounting means rotatably coupled to said body about the central axis C, said tool mount means including two tool blocks diametrically opposed about said axis in a balanced arrangement, such that when the main shaft is moved longitudinally about the central axis, the tool mounting means undergoes transverse movement relative said axis;
   said linear feed means further comprising a translation means engagingly disposed between lead screw and said tool mounting means, said translation means adjustable between at least a first and a second position.

27. The portable apparatus of claim 26 where said translation means is comprised of a reduction gear assembly such as to effect a differential rotational velocity in said first and second position between the rotation of said lead screw and the rotation of said tool mounting means.

28. The portable apparatus of claim 26 where when the taper assembly is positioned in nonoperative engagement with said main shaft and said linear feed means, the cutting tool assembly is forced to follow a linear path upon operation of said linear feed means and rotation of said main shaft, so as to produce a linear or straight cutting surface on the pipe end.

29. The portable apparatus of claim 26 where when the taper assembly is positioned in operative engagement with said main shaft and said linear feed means, the cutting tool assembly is forced to follow a linear path inclined from said central axis upon operation of said linear feed means and rotation of said main shaft, so as to produce a tapered cutting surface on the pipe end.

30. The portable apparatus of claim 26 where the radial feed means comprises mounting members operatively disposed through mutually engageable guide surfaces therebetween, a first member threadedly engageable to said main shaft, a second member threadedly engageable to said tool mounting means, a third mounting member directly engageable to said main shaft and manually operable through mutually connecting means to induce rotational motion to said main shaft, the rotation of said third member or the longitudinal movement of said main shaft resulting in transverse movement of the tool mounting means relative to the central axis.

31. The portable apparatus of claim 26 wherein the linear feed means further includes a drive motor, operatively engaged to a first member, a second mounting member detachably engageable to said lead screw through said translation means, the combination drive motor, lead screw and translation means such that upon engagement of the lead screw by the translation means, the body is moved longitudinally along the frame.

32. The portable apparatus of claim 31 where the pitch of a thread cut on the pipe may be changed by the replacement of the lead screw.

33. The portable apparatus of claim 26 further comprising a secondary feed assembly, said assembly comprising a drive motor operatively engaged to said lead screw such as to provide a means for inducing longitudinal movement of the body about the frame independent said linear feed means.

34. The portable apparatus of claim 26 where said linear feed means is operable independently of said radial feed means.

35. The portable apparatus of claim 26 in which said attachment means for attaching said frame to the end of a pipe comprises a jaw assembly attachable to said pipe end independently of said frame and including a circular base plate for concentric alignment with said pipe end, said attachment means also comprising a circular housing base affixed to said housing means and the center of which coincides with said main shaft central axis, said housing base being attachable to said jaw assembly, after attachment of said jaw assembly to said pipe end, so that said central axis and said pipe axis are substantially coincidental.

36. The portable apparatus of claim 26 further including an automatic disengagement means for transverse withdrawal of the cutting tool from the pipe end when a certain length thread is cut on said shoulder.

37. The portable apparatus of claim 26 where the taper means includes two operative engaging positions, one position adapted to cut a female thread, the other position adapted to cut a male thread.

38. A portable apparatus for threading the end of a length of pipe, comprising:
   a frame;
   a body mounted within the frame in longitudinally movable relation with the frame along a longitudinal axis;
   a main shaft mounted within the body in longitudinally movable relation with said body along said axis;
   a pipe holder mounted on said frame proximate a first end of the body and adapted to hold the end of a length of pipe in axial alignment with the main shaft;
   a tool holder mounted on the first end of the body in rotatable relation with the body about said axis and radially movable relative to said axis;
   a drive member mounted on the body and coupled to the tool holder to rotate the tool holder relative to the axis;
   a first drive train interconnectable between the first drive member and the body to move the body along the axis relative to the frame; and
   a second drive train interconnectable between the drive member and the shaft to move the shaft along said axis relative to the body.

39. The apparatus of claim 38 wherein the second drive train is interconnectable between the first drive train and the shaft.

40. The apparatus of claim 38 in which the first drive train includes gearing capable of more than one gear ratio to move the body at different rates relative to the frame.

41. The apparatus of claim 40 in which the second drive train includes gearing capable of more than one gear ratio to move the shaft at different rates relative to the body.

42. The apparatus of claim 41 in which the second drive train is retractable from the body.

43. A portable apparatus for threading the end of a length of pipe, comprising:
   a frame;
   a body mounted within the frame in longitudinally movable relation with the frame along a longitudinal main axis;
   a main shaft axially aligned with and movable along the main axis relative to the body;
   a removable pipe holder attached to the frame and adapted to hold an end of a length of pipe in axial alignment with the main shaft at a first end of the shaft; and a first end of the body;
   a spindle mounted on the first end of the main shaft to be rotatable about the main shaft;
   a tool holder mounted on the first end of the body in rotatable, balanced relation with the body and coupled to the spindle to rotate with the spindle, said tool holder also being mounted to be movable toward and away from a length of pipe in the pipe holder;
   a mechanical linkage between the tool holder and the main shaft to move the tool holder toward or away from a length of pipe in the tool holder in response to axial movement of the main shaft;
   a linear gear rotatably mounted in the body parallel to the main shaft to be rotatable about its longitudinal axis;

a first drive train mounted in the body interconnectable between the spindle and the main shaft to move the body along the main axis relative to the frame in response to rotational movement of the spindle; and a second drive train retractably mounted in the body and interconnectable between the linear gear and the main shaft to move the shaft along the main axis relative to the body.

* * * * *

UNITED STATES PATENT AND TRADEMARK OFFICE
CERTIFICATE OF CORRECTION

PATENT NO. : 4,854,200
DATED : August 8, 1989
INVENTOR(S) : Mynhier

It is certified that error appears in the above-identified patent and that said Letters Patent is hereby corrected as shown below:

In the Specification:

Col. 4, line 18, please delete "inventionillustrating" and insert --invention illustrating--.

In the Claims:

Col. 12, line 68 through col. 13, line 8, please delete the following after "means.": independently of said frame and including a circular base plate for concentric alignment with said pipe end, said attachment means also comprising a circular housing base affixed to said housing means and the center of which coincides with said main shaft central axis, said housing base being attachable to said jaw assembly, after attachment of said jaw assembly to said pipe end, so that said central axis and said pipe axis are substantially coincidental.

Signed and Sealed this

Twenty-eighth Day of August, 1990

Attest:

HARRY F. MANBECK, JR.

Attesting Officer    Commissioner of Patents and Trademarks